Oct. 29, 1929.  R. E. L. SPOTSWOOD  1,733,918
SIGN ATTACHMENT FOR AUTOMOBILES
Filed May 17, 1928  2 Sheets-Sheet 2
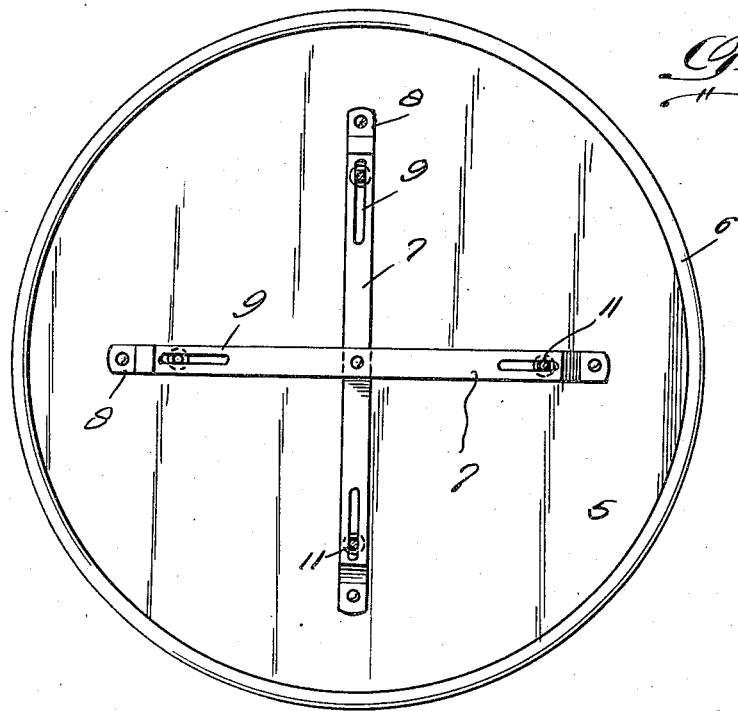
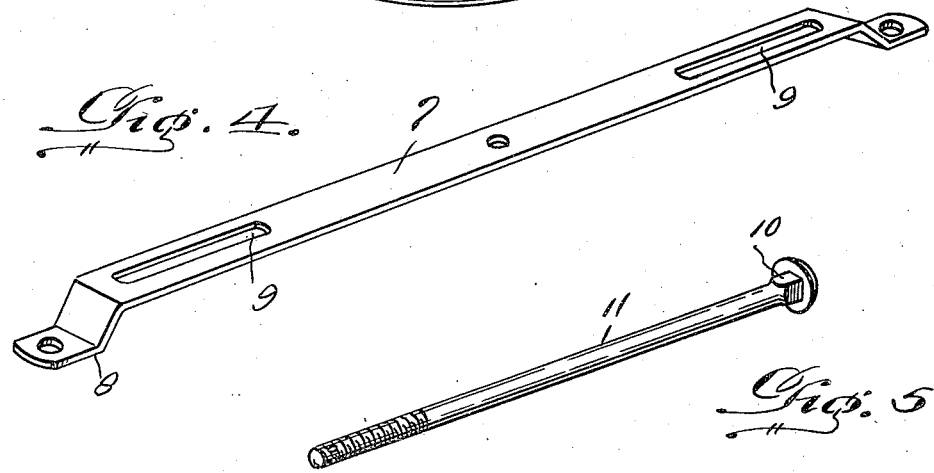
Inventor
R.E.L. Spotswood,
By Clarence A. O'Brien
Attorney Patented Oct. 29, 1929

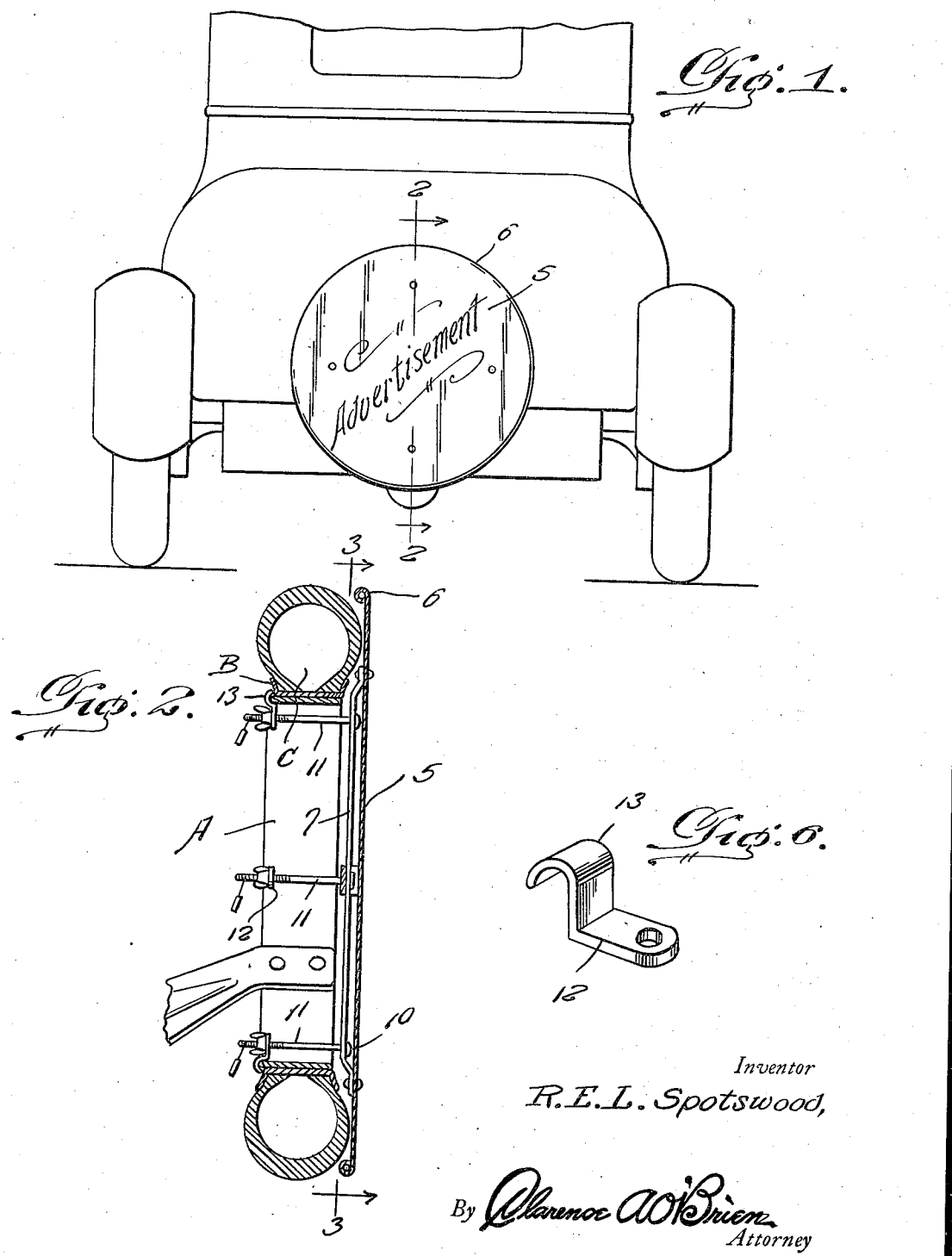

1,733,918

UNITED STATES PATENT OFFICE

ROBERT EDWARD LEE SPOTSWOOD, OF SPRING HILL, ALABAMA

SIGN ATTACHMENT FOR AUTOMOBILES

Application filed May 17, 1928. Serial No. 278,452.

This invention relates to new and useful improvements in signboards, placards, and the like, and aims to provide a simple and inexpensive advertising device that is primarily adapted for attachment to the spare tire and rim usually located at the rear end of an automobile. In carrying out the present invention there is provided a sign member having means whereby to facilitate its rigid association with a spare tire rim or the carrier therefor, said means being of such a nature as to permit the device to be readily removed from the spare tire or carrier so that the tire may be employed when needed.

With the foregoing and other objects in view as the nature of the invention will be better understood, the same comprises the novel form, combination and arrangement of parts hereinafter more fully described, shown in the accompanying drawings and claimed.

In the drawings wherein like reference characters indicate corresponding parts through the several views:

Figure 1 is a fragmentary rear edge elevation of an automobile equipped with my improved sign.

Figure 2 is a detail vertical section taken substantially upon the line 2—2 of Figure 1.

Figure 3 is a vertical longitudinal section taken substantially upon the line 3—3 of Figure 2 for more clearly disclosing the means whereby to facilitate the attachment of the sign to the spare tire.

Figure 4 is a perspective of one of the sign frame members.

Figure 5 is a similar view of one of the elongated bolts slidably arranged with respect to the frame unit, and Figure 6 is a perspective of one of the hook members forming an essential feature of the present invention.

Now having particular reference to the drawings, my novel sign consists of a sign board or plaque 5 preferably of circular formation, and of any particular material, the edge thereof being rolled as at 6. The outer surface of this sign member has applied thereto suitable advertising indicia as suggested in Figure 1, while arranged upon the rear side thereof is a frame unit consisting of a pair of metallic cross straps 7—7, the ends of which are offset inwardly to provide feet 8 for engagement with the sign member and to be riveted or otherwise secured thereto, these offset feet maintaining the said straps in spaced relation with the sign as clearly disclosed in Figure 2. Adjacent opposite ends of these straps 7 are longitudinally extending slots 9, while slidably arranged therein are squared portions 10 directly in back of the heads of elongated bolts 11, which bolts are threaded at their outer ends as clearly disclosed. Slidably arranged upon the outer end of each bolt is a hook member 12, the hook 13 of which extends inwardly, and is adapted for engagement with the inner edge of the spare tire carrier A for the rim B of the spare tire C. Threaded upon the threaded ends of the bolts in back of the hooks 12 are wing nuts 14, and obviously inward turning thereof will cause the binding of the hooks against the carrier as well as against the inner edge of the spare tire rim for tightly securing the device in position.

It will thus be seen that I have provided a highly novel, simple and extremely useful sign board attachment for automobiles, even though I have herein shown and described the invention as consisting of certain detail structural elements it is nevertheless to be understood that some changes may be made therein without affecting the spirit and scope of the appended claim.

Having thus described the invention, what I claim as new and desire to secure by Letters Patent is:—

In a sign device for application to an automobile spare tire carrier, a sign member adapted to receive advertising indicia upon its outer face, means associated with the inner face of said member whereby to facilitate its detachable association with a spare tire carrier, said means consisting of a frame unit consisting of metallic straps secured at their opposite ends to the sign member, said strips each being formed with a longitudinal slot adjacent each end; bolts arranged through said slots, the straps being spaced from the sign member at the slotted portion thereof, to accommodate the heads of said bolts between the said strips and the sign member and having nuts upon their outer ends, and hook members arranged upon the bolts inwardly of the nuts whereby to be engaged with the inner edge of the spare tire carrier.

In testimony whereof I affix my signature.

ROBERT EDWARD LEE SPOTSWOOD.